INVENTOR.
ANTHONY A. ALBANESE
BY Philip Schneider
Louis B. Appleb...
ATTORNEYS

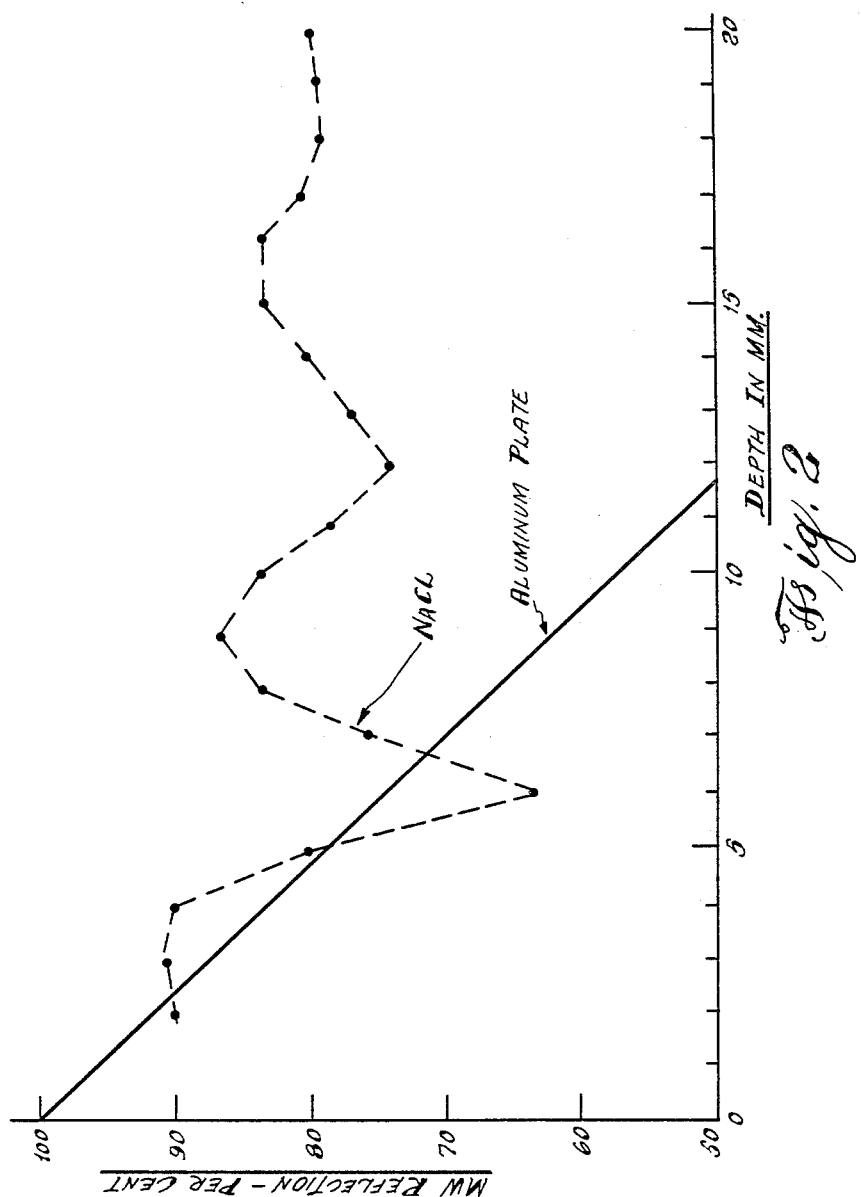

3,379,971
MICROWAVE MEANS AND METHOD FOR MEASURING THE ELECTROLYTIC CONTENT OF SOLUTIONS
Anthony A. Albanese, Harrison, N.Y., assignor, by mesne assignments, to the United States of America as represented by the Secretary of the Navy
Filed Mar. 16, 1965, Ser. No. 440,335
2 Claims. (Cl. 324—58.5)

ABSTRACT OF THE DISCLOSURE

Microwave reflection analysis is applied to measure the dielectric constant and thus the water content of liquid biologic samples wherein the frequency of the microwave generator is set at 3000 megacycles while the liquid level is varied to obtain a minimum reflectance value for the liquid sample. From the minima established, the dielectric constant of the liquid and the water content of the sample are derived through matching with known samples.

---

The invention relates to means and method for the measurement of the electrolytic content of solutions and especially to a means and method for measuring the microwave-radiation reflection coefficient of samples of organic fluids containing electrolytic material.

Change in body weight of experimental animals and man is the most widely employed criterion of the biological value of test diets. The validity of such measurements rests upon the assumption that no changes shall be induced by the dietary in the principal tissue compartments of the body—namely, water, fat, and protein. However, appreciable shifts in these tissue compartments frequently accompany changes in the diet, nutritional status, and age of the test animal.

It has long been known from studies in experimental animals and young children that an increase in calories from carbohydrates cause hydration, whereas an increase in calories from fats causes dehydration of body tissues. High protein diets also cause a decrease in fluid spaces. Considerable evidence is also on hand to show that protein quality influences the degree of tissue dehydration.

Investigation of these factors has long concerned many investigators. Unfortunately, interpretation of the data obtained by dye, or salt, or radioactive dilution methods regarding body water changes cannot be conveniently made in biochemically or physiologically abnormal persons.

Continued interest and study led to the thought that microwave absorption or reflection might be employed to measure water and fat content of tissue. This notion was based on findings that the dielectric constant of the tissue is a primary function of the amount of water in the tissue, and that dielectric constants of isolated tissues could be estimated from the absorption of radiation in the range of 150–10,000 megacycles (mc.) The amount of water in the tissue varies inversely with the amount of electrolytic material. Now, since the microwave reflection coefficient is a function of the electrolytic content, the electrolytic content (and hence the water content) can be determined by measurement of the reflection coefficient of a solution.

The objects and advantages of the present invention are accomplished by measuring the microwave reflection coefficient of electrolytic solutions. In a typical embodiment of the invention, a sample of the test solution is employed as the termination for a waveguide through which microwave energy is propagated and the reflection coefficient of the test solution is measured. A critical characteristic of the procedure is that the depth of the sample must be in the vicinity of a half-wavelength of the microwave energy.

An object of the invention is to determine the electrolytic content of fluid samples.

Another object is to determine the electrolytic content of fluid samples by means of microwave techniques.

Other objects and many attendant advantages of this invention will be readily appreciated as the same becomes better understood by reference to the following detailed description when considered in connection with the accompanying drawings wherein:

FIG. 2 is a set of curves showing the percentage of microwave energy reflectance of a sodium chloride solution and an aluminum plate versus their thicknesses in millimeters.

Figure 1:
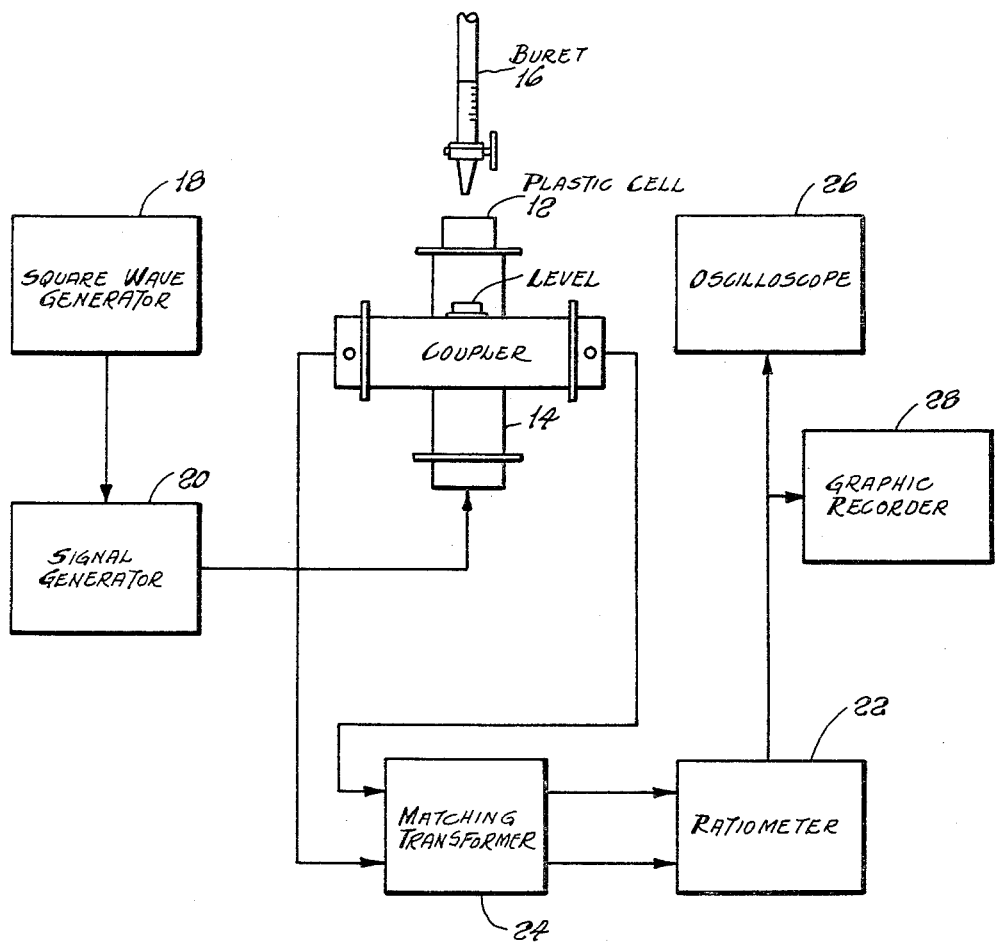
FIG. 1 is a schematic block diagram of an embodiment of the invention.

FIG. 1 shows equipment which may be employed in the measurement of the reflection coefficient of a sample of an electrolytic solution. The sample is contained in a plastic cell which may be fabricated from a non-conductive plastic such as Lucite or polystyrene. The plastic cell 12 is placed over the open end of the vertical member of a set of orthogonal waveguide sections such as the Hewlett-Packard S750D crosswave guide 14.

A burst 16 containing the test solution can be suspended above the plastic cell 12 and used to fill the cell 12 to the desired level, as will be explained later.

A source wave generator 18, such as the Hewlett-Packard 211A, feeds into a single generator 20, such as the Hewlett-Packard 616A, which generates microwave energy. The microwave energy is propagated through the crosswave guide 14 and then coupled to a ratiometer 22, such as the Hewlett-Packard 416A, through a matching transformer 24, such as the Hewlett-Packard AC60K. The ratiometer 22 indicates the amount of energy which is reflected by the solution. The reflected energy can then be displayed visually on an oscilloscope 26 or on a graphic pen recorder 28.

It has been found that measurements can be made with radiation ranging from 150 to 10,000 megacycles in frequency, with optimum results being obtained at 3000 megacycles. Therefore, a frequency of 3000 megacycles was used. The inventor has found that the depth of the sample in the plastic cell 12 has a decided influence on the percentage of energy which is reflected. FIG. 2 shows the percentage of reflection plotted in terms of the depth of the sample solution in terms of millimeters. An aluminum plate, which constitutes a short circuit, is placed over the open end of the crosswave guide instead of the solution, and the needle of the meter on the ratiometer 22 is adjusted to show 100% reflectance, or a reflection coefficient of 1. The shorting plate is then removed and the plastic cell 12 is substituted for it. The solution in the buret 16 is now allowed to flow into the cell 12. Readings of the percentage of reflectance are taken as the liquid fills the cell, for example, at increases of 1 mm. in depth. It can be seen that the percentage of reflection is a minimum at a depth of 6 mm., with successively smaller minima at depths of 12 and 18 mm. This is significant because 6 mm. corresponds to a half-wavelength of the microwave energy at 3000 megacycles. Readings taken for the aluminum shorting plate show no such minima but only a steady decrease with thickness of the plate. This dip in reflectance is characteristic of solutions containing electrolytic material; the wavelength-associated minima are very sensitive to concentrations of electrolyte.

Thus, to find the reflection coefficient of a test solution, the plastic cell 12 can be filled to a predetermined half-wavelength depth, or the buret 16 can be allowed to empty slowly into the plastic cell 12 while the meter on the ratiometer 22 is watched and the lowest reading is determined.

Standard calibration curves showing the amount of electrolyte present for a given reflectance reading can be made up from known samples of a given liquid such as blood or urine, for example. The electrolyte concentrations of all future samples of the same type of liquid can then be read off from the curves when their reflectances are measured.

Obviously, many modifications and variations of the present invention are possible in the light of the above teachings. It is therefore to be understood that within the scope of the appended claims the invention may be practiced otherwise than as specifically described.

I claim:
1. A method for determining the water content of an electrolytic biologic solution which includes measuring the dielectric coefficient of said solution comprising:
   (a) terminating the open upper end of a vertically mounted waveguide section with a thin-walled dielectric container having a filling aperture at the upper portion thereof;
   (b) gradually filling said container at said aperture with a biologic solution of known water content, such that the depth of said known solution increases gradually as said container is filled;
   (c) propagating microwave energy of a frequency of 3000 mc. up the length of said waveguide section, such that said energy impinges on the bottom of said thin walled container, propagates therethrough and is reflected back at the free surface of said solution;
   (d) recording the percentage of energy which is reflected back through said waveguide section as the depth of said known solution increases to ascertain points of minimum reflected energy;
   (e) repeating steps (b) through (d) with a solution of unknown water content; and
   (f) comparing the recordings of said known and unknown solution to determine the correspondence of said minima.

2. An apparatus for measuring the water content of an electrolytic solution comprising:
   a vertically oriented section of electrical waveguide having an open end;
   a dielectric container mounted in said open end and projecting downwardly into said waveguide so as to hold said electrolytic solution in said waveguide;
   means for gradually filling said container with said electrolytic solution;
   means for propagating microwave electromagnetic energy up said waveguide section, into said container and through said solution in said container; and
   means for indicating the percentage of said microwave energy which is reflected at the free surface of said solution with increasingly different depths of said solution in said container.

References Cited

UNITED STATES PATENTS

| | | | |
|---|---|---|---|
| 2,611,804 | 9/1952 | Zaleski | 324—58.5 |
| 2,939,076 | 5/1960 | Dropkin | 324—58 |
| 3,079,551 | 2/1963 | Walker | 324—58.5 |
| 3,233,172 | 2/1966 | Luoma | 324—58 |

OTHER REFERENCES

Lurio and Stern, Journal of Applied Physics, vol. 31, No. 10, October 1960, pp. 1805–1809.

RUDOLPH V. ROLINEC, *Primary Examiner.*

P. F. WILLE, *Assistant Examiner.*